(12) United States Patent
Creta et al.

(10) Patent No.: US 7,165,131 B2
(45) Date of Patent: Jan. 16, 2007

(54) SEPARATING TRANSACTIONS INTO DIFFERENT VIRTUAL CHANNELS

(75) Inventors: Kenneth C. Creta, Gig Harbor, WA (US); Aaron T. Spink, San Francisco, CA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 10/833,236

(22) Filed: Apr. 27, 2004

(65) Prior Publication Data
US 2005/0251612 A1 Nov. 10, 2005

(51) Int. Cl.
*G06F 13/00* (2006.01)
*G06F 13/36* (2006.01)
*G06F 13/42* (2006.01)

(52) U.S. Cl. .............................. 710/100; 710/52; 710/5; 710/113; 710/158; 710/310; 710/309; 710/316; 710/105; 370/401; 370/252; 370/395.4

(58) Field of Classification Search ..................... None
See application file for complete search history.

(56) References Cited

U.S. PATENT DOCUMENTS 6,076,130 A * 6/2000 Sharma ....................... 710/310
6,148,001 A * 11/2000 Soirinsuo et al. ........ 370/395.4
6,243,781 B1 6/2001 Gandhi et al. ............... 710/129
6,272,563 B1 8/2001 Ajanovic et al. .............. 710/29
6,516,375 B1 2/2003 Ajanovic et al. ............ 710/305
6,563,831 B1 * 5/2003 Dally et al. .................. 370/401
6,681,292 B1 1/2004 Creta et al. .................. 711/119

(Continued)

FOREIGN PATENT DOCUMENTS

EP 0 674 272 9/1995

(Continued)

OTHER PUBLICATIONS

Co-Pending U.S. Appl. No. 10/832,606, filed Apr. 27, 2004, entitled "Globally Unique Transaction Identifiers" by Herbert H. Hum, et al.

(Continued)

*Primary Examiner*—Rehana Perveen
*Assistant Examiner*—Brian Misiura
(74) *Attorney, Agent, or Firm*—Trop, Pruner & Hu, P.C.

(57) ABSTRACT

In one embodiment of the present invention, a method may include separating incoming transactions to an agent of a coherent system into at least a first channel, a second channel, and a third channel, based upon a type of the incoming transactions. The incoming transactions may be sent by a peer device coupled to the coherent system. By separating the transactions based on type, deadlocks may be avoided.

26 Claims, 3 Drawing Sheets

U.S. PATENT DOCUMENTS

| | | | |
|---|---|---|---|
| 6,760,793 B1* | 7/2004 | Kelley et al. | 710/52 |
| 6,801,976 B1* | 10/2004 | Creta et al. | 710/310 |
| 6,874,042 B1* | 3/2005 | Sauber | 710/38 |
| 6,912,612 B1* | 6/2005 | Kapur et al. | 710/309 |
| 7,047,374 B1* | 5/2006 | Sah et al. | 711/158 |
| 2002/0083256 A1 | 6/2002 | Pannell | |
| 2002/0103948 A1 | 8/2002 | Owen et al. | |
| 2002/0147869 A1* | 10/2002 | Owen et al. | 710/105 |
| 2003/0041185 A1* | 2/2003 | Creta et al. | 710/5 |
| 2003/0188072 A1 | 10/2003 | Creta et al. | 710/306 |
| 2004/0019714 A1* | 1/2004 | Kelley et al. | 710/52 |
| 2005/0141434 A1* | 6/2005 | Cornett | 370/252 |
| 2005/0251611 A1* | 11/2005 | Creta et al. | 710/316 |
| 2006/0101179 A1* | 5/2006 | Lee et al. | 710/113 |

FOREIGN PATENT DOCUMENTS

WO     WO 02/15470     2/2002

OTHER PUBLICATIONS

Co-Pending U.S. Appl. No. 10/832,607, filed Apr. 27, 2004, entitled "Transmitting Peer-to-Peer Transactions Through a Coherent Interface" by Kenneth C. Creta, et al.

* cited by examiner

SEPARATING TRANSACTIONS INTO DIFFERENT VIRTUAL CHANNELS

BACKGROUND

The present invention relates to data communication, and more particularly to communication between devices within a system.

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices may be coupled to the same bus. Accordingly, it is easy to read or write to devices on the same bus.

However, as bus interface speeds increase, bus architectures are moving away from multi-drop architectures towards point-to-point architectures. In such point-to-point architectures, peer-to-peer communication becomes more difficult, as synchronization, ordering, and coherency of such communications becomes more difficult. One example of point-to-point architecture is a PCI Express™ architecture in accordance with the PCI Express Base Specification, Rev. 1.0 (published Jul. 22, 2002).

Because multiple buses of a system or coupled thereto may use different communication protocols, communications difficulties exist. For example, peer-to-peer communication between input/output (I/O) devices may be sent according to a first protocol, but due to the point-to-point architecture and secondary protocols used by other components between the I/O devices, such communication becomes difficult.

Further, I/O interfaces typically identify transactions as either posted and non-posted, and the ordering rules for each type differ. Certain ordering rules are in place for functional correctness (such as read transactions cannot pass write transactions, writes cannot pass writes, and the like). In addition to such ordering rules, certain protocols, such as PCI, require posted cycles to progress past stalled non-posted cycles. This is to avoid deadlocking the interface due to a lack of forward progress. In certain protocols, such as PCI, forward progress is enabled by allowing a target to "retry" the request, which signals to the initiator that it should bypass the attempted transaction and try another that might be behind it.

However, where I/O devices of a first protocol are coupled to a system having a second protocol, different methods exist for avoiding deadlocks, and sometimes these different mechanisms are not compatible. Such incompatibilities particularly exist when one protocol does not provide for retry options, and credit tracking of transactions is done at different layers of different protocols. Accordingly, a need exists to provide for deadlock-free transfer of transactions through a system, where multiple protocols exist for different components of the system.

DETAILED DESCRIPTION

Figure 1:
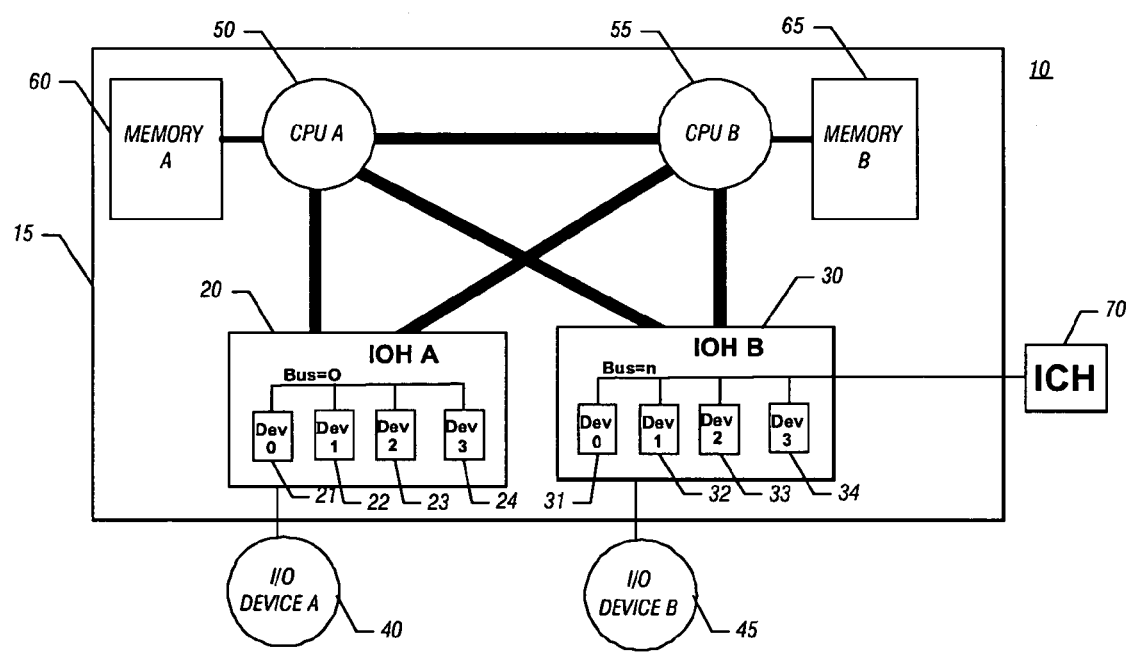
FIG. 1 is a block diagram of a system in accordance with one embodiment of the present invention.

Referring to FIG. 1, shown is a block diagram of a system in accordance with one embodiment of the present invention. As shown in FIG. 1, system 10 may be a multi-processor system including a coherent interface in accordance with an embodiment of the present invention. That is, system 10 may represent any one of a desired desktop, mobile, server platform or other such platform, in different embodiments. In certain embodiments, interconnections between different components of FIG. 1 may be point-to-point interconnects that provide for coherent shared memory within system 10, and in one such embodiment the interconnects and protocols used to communicate therebetween may form a common system interface (CSI). In such manner, multiple processors, memories, and other components of system 10 may coherently interface with each other.

Referring to FIG. 1, system 10 may include a first processor 50 (CPU A) and a second processor 55 (CPU B). In various embodiments, each processor may include memory controller functionality such that the processors may directly interface with an associated shared memory via a point-to-point interconnect. For example, as shown in FIG. 1, processor 50 may be coupled to a memory 60 (memory A) via a point-to-point interconnect and processor 55 may be coupled to a memory 65 (memory B) via a similar point-to-point interconnect. More so, processors 50 and 55 may also be coupled to each other via a point-to-point interconnect. Similarly, each of processors 50 and 55 may be coupled via point-to-point interconnects to each of a first input/output hub (IOH A) 20 and a second IOH 30 (IOH B).

In the embodiment of FIG. 1, all components within box 15 may collectively form a coherent system (i.e., coherent system 15). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 60 and 65 may be reserved for non-coherent transactions. While the embodiment of FIG. 1 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 1, I/O hubs 20 and 30 may each include a plurality of ports (e.g., ports 21–24 in IOH 20 and ports 31–34 in IOH 30) to interface with I/O devices coupled thereto. For example, in certain embodiments, such I/O devices may be devices in accordance with one or more bus schemes. In one embodiment, such I/O devices may be PCI Express™ devices. As used herein, such devices may be referred to as "PCI-E" devices.

For simplicity, FIG. 1 shows a single I/O device coupled to each I/O hub, namely I/O device (I/O device A) 40 coupled via port 21 to IOH 20 and I/O device (I/O device B)

45 coupled via port 31 to IOH 30. It is to be understood that the number of ports in an I/O hub in accordance with an embodiment of the present invention may vary, and the number of ports and devices coupled thereto shown in FIG. 1 are for illustrative purposes only.

Also shown in FIG. 1 is a legacy I/O controller hub (ICH) 70 coupled to IOH 30. In one embodiment, ICH 70 may be used to couple legacy devices such as a keyboard, mouse, and Universal Serial Bus (USB) devices (e.g., devices in accordance with the USB Specification Rev. 2.0 (published December 2000)) to coherent system 15.

While the I/O hubs shown in FIG. 1 include a plurality of ports, it is to be understood that the hubs may realize various functions using a combination of hardware, firmware and software. Such hardware and software may be used so that the I/O hub may act as an interface between coherent system 15 (e.g., shared memories 60 and 65, processors 50 and 55, and IOHs 20 and 30), and devices coupled thereto such as I/O devices 40 and 45. In addition, the I/O hubs of FIG. 1 may be used to support various bus or other communication protocols of devices coupled thereto. IOH 20 and IOH 30 may act as agents to provide a central connection between two or more communication links. In particular, IOH 20 and IOH 30 may be referred to as "CSI agents" that provide a connection between different I/O devices coupled to coherent system 15. In various embodiments, other components within coherent system 15 may also act as CSI agents.

In various embodiments, each port of I/O hubs 20 and 30 may include a plurality of channels, often referred to herein as "virtual channels" that together may form a virtual network, and associated buffers to communicate data, control and status information between various devices. In one particular embodiment, each port may include at least three such channels, including a standard channel, a bypass channel, and a completion channel, although the scope of the present invention is not so limited. Additionally, these channels may be non-coherent channels used to route non-coherent transactions of I/O devices coupled to coherent system 15. In certain such embodiments, additional channels may be present for coherent transfers. In other embodiments, two virtual channels may be present. In such an embodiment, the two channels may be a standard channel and bypass channel. In such manner, transactions flowing between devices may avoid deadlocks that may occur when posted transactions become delayed behind non-posted transactions, such as reads.

Figure 2:
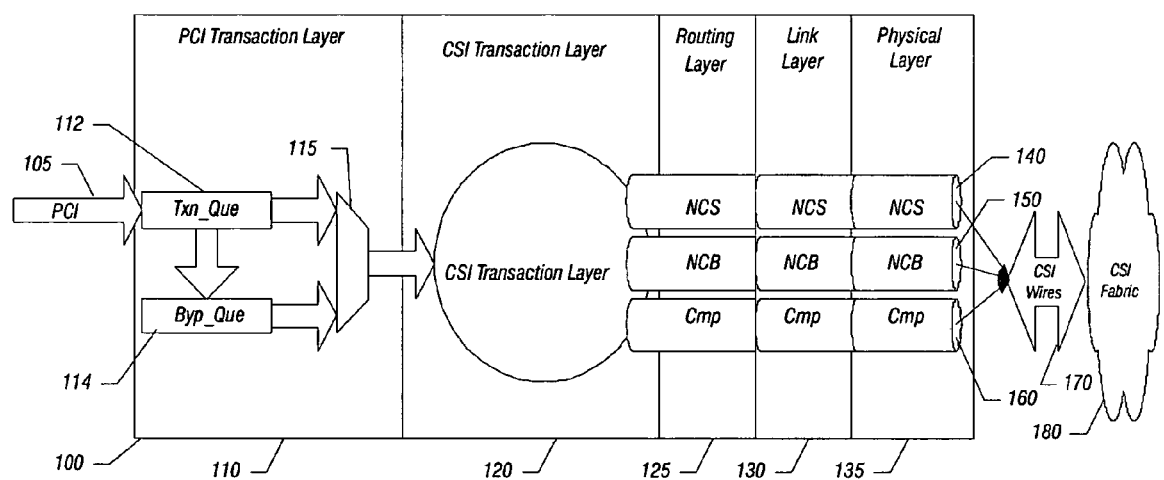
FIG. 2 is a block diagram of an input/output hub in accordance with an embodiment of the present invention.

Referring now to FIG. 2, shown is a block diagram of a I/O hub in accordance with one embodiment of the present invention. As shown in FIG. 2, I/O hub 100 is coupled between a PCI interface 105 and wires 170, which may be wires of coherent system 15 (e.g., "CSI wires"), leading to a fabric 180. For example in the embodiment discussed above in FIG. 1, I/O hub 100 may be one of I/O hub 20 or 30, and fabric 180 may be a fabric of coherent system 15 (e.g., a "CSI fabric" or a "common system fabric"), and PCI interface 105 may couple I/O device 40 with I/O hub 20. While discussed in the embodiment of FIG. 2 as interfacing with a PCI device (e.g., a "traditional" PCI device, or a device in accordance with the PCI-X Specification, version 2.0 (published Jul. 22, 2002), or a PCI-E device), it is to be understood the scope of the present invention is not so limited, and other embodiments may interface with other protocols using posted and non-posted transactions or other ordering schemes. For example, layer 110 may be an interface to a processor core, in one embodiment.

Referring still to FIG. 2, PCI transactions may be input into I/O hub 100 via PCI interface 105. Such transactions may be received in a PCI transaction layer 110 of I/O hub 100. PCI transaction layer 110 may include a first queue 112 and a second queue 114. In one embodiment, first queue 112 may be a transaction queue (txn_que) and second queue 114 may be a bypass queue (byp_que). PCI transaction layer 110 may maintain different traffic classes separate by maintaining separate credit accounts for posted requests, non-posted requests, and completions. However, to assure compliance with ordering rules (e.g., completions moving past posted requests), when first queue 112 becomes backed up, posted transactions may be forwarded to second queue 114. First queue 112 and second queue 114 may be arbitrated between and transactions may be passed via multiplexer 115 into a CSI transaction layer 120. In one embodiment, first queue 112 and second queue 114 may be arbitrated using anti-starvation logic.

When transactions are received in CSI transaction layer 120, traffic is unordered and CSI transaction layer 120 may split transactions into one of a plurality of different virtual channels. CSI transaction layer 120 may also be referred to as a CSI protocol layer. As shown in the embodiment of FIG. 2, three such virtual channels may be present, namely a first virtual channel 140, a second virtual channel 150, and a third virtual channel 160. In the embodiment shown in FIG. 2, first virtual channel 140 may be a non-coherent standard (NCS) channel; second virtual channel 150 may be a non-coherent bypass (NCB) channel; and third virtual channel 160 may be a completion (CMP) virtual channel. Such a CMP virtual channel may be used to indicate ordering at a receiving device. For example, a completion packet may be sent from an agent receiving a peer-to-peer transaction to the agent sending the transaction. However, it is to be understood that in other embodiments more or fewer virtual channels may be present, and virtual channels may be differently named and utilized. While responsible for other activities, further details of CSI transaction layer 120 will be discussed further below.

As shown in FIG. 2, there may be a plurality of additional layers within I/O hub 100, including a routing layer 125, a link layer 130, and a physical layer 135. In various embodiments, these layers typically maintain the three virtual channels separate throughout I/O hub 100, and the channels may be kept separately through additional components and interconnects coupled thereto, until their receipt in a corresponding transaction layer of a receiving device, such as an I/O hub.

While discussed in the embodiment of FIG. 2 as including three virtual channels, it is to be understood that in other embodiments additional virtual channels may be present in a desired protocol. Further, while discussed herein as being used within a coherent system, it is to be understood that other embodiments may be implemented in a non-coherent system to provide for deadlock-free routing of transactions. Thus for smooth traffic flow throughout a coherent system, the channels may keep traffic separated through various layers of the system, including, for example, physical, link, and routing layers, such that there are no dependencies. In addition to the three channels, an agent may preserve functional ordering at the source transaction layer. In other embodiments, a fourth virtual channel may be present and may be used for completions. In such manner, two virtual channels may be used for completions, one for completions with data and one for completions without data. For simplicity, the embodiment shown in FIG. 2 includes a single completion channel, although the scope of the present invention is not so limited.

In various embodiments, flow control for the three virtual channels may be maintained separately, such that there are no interdependencies among traffic flowing between the different channels. Thus there is no ordering within each of the virtual channels. Further, transactions of peer devices (which order transactions) coupled to a coherent system flow through the virtual channels in an unordered fashion. In one embodiment, a credit-based flow control mechanism may be implemented such that the separate channels have separate pools of credits. However, in other embodiments other flow control mechanisms, such as a retry mechanism or another type of flow control may be realized.

Different types of transactions may be routed though different virtual channels in accordance with an embodiment of the present invention to avoid deadlocks. Such transactions may include, for example, read and write transactions, data messages and the like. Referring now to Table 1 below, shown is a mapping of PCI transactions to a plurality of virtual channels in accordance with one embodiment of the present invention.

TABLE 1

| PCI Transaction | Virtual Channel Used |
| --- | --- |
| Memory Write | NCB |
| Memory Read | NCS |
| I/O Read and Write | NCS |
| Configuration Read and Write | NCS |
| Peer-to-peer Memory Writes and Messages | NCB |
| Peer-to-peer Memory Reads | NCS |
| Peer-to-peer I/O and Configuration Reads and Writes | NCS |
| Peer-to-peer read completions | NCB or CMP |
| Coherent system completions | CMP |

While shown as routing the specific PCI transaction types of Table 1 on specific virtual channels, it is to be understood that in other embodiments, PCI transactions or transactions of another I/O device coupled to a coherent system may be transmitted on any desired virtual channel.

In one embodiment, CSI transaction layer 120 may include various protocol engines used to form, order, and process packets for transmission through a coherent system. For example, in one embodiment, CSI transaction layer 120 may include a coherence engine, an interrupt engine, an I/O engine, among others. Using such engines, CSI transaction layer 120 may form a packet having a common system header (also referred to as a "system interconnect header"). The packets thus formed in CSI transaction layer 120 may be provided to routing layer 125 on a given one of the three virtual channels shown in FIG. 2.

In various embodiments, routing layer 125 may provide a flexible and distributed manner of routing coherent packets from source to destination. The destination-based routing may be determined using routing tables within routing layer 105, which allows for adaptive routing and on-line reconfiguration of the routing table. In one embodiment, a common system header generated by CSI transaction layer 120 may include information that identifies a destination, an input port and a virtual network, and these values may be input into a routing table to determine the desired output port and the virtual network on which the transaction may flow. In various embodiments, routing tables may be stored in protected configuration space and programmed by firmware. Such routing tables may be programmed to enable deadlock-free routing for various topologies. Such destination-based routing may be based on a node identifier (node ID), which uniquely identifies an agent within the coherent system.

From routing layer 125, transactions and packets may be passed to link layer 130. Link layer 130, in various embodiments, may be used to provide reliable data transfer and flow control between two directly connected coherent agents, and also provide for virtualizing a physical channel between the devices. Thus link layer 130 may be flow controlled to prevent overflow or underflow, and may also be used to provide error detection and recovery. In one embodiment, flow control may be implemented using a flit-based level credit/debit flow control. In various embodiments, a flit may refer to a smallest unit of data transfer which, in one embodiment, may be 80 bits long. A packet may be a logical grouping of flits. In certain embodiments, a packet may be the smallest unit of information that includes routing and other information via a header. Each packet may contain a header and an optional data field. In certain embodiments, the header may be one to two flits long, and a data portion may extend to a cacheline size of the coherent system.

In various embodiments, link layer 130 may virtualize a physical channel into multiple message classes and virtual networks. In such manner, a physical channel may be multiplexed among multiple virtual channels. Such message classes may be used to avoid protocol level deadlocks and provide quality of service (QoS) measures. In various embodiments, a plurality of virtual networks may be implemented, each having a plurality of virtual channels. In various embodiments, a group of virtual channels that includes all the message classes may form a virtual network. Each virtual network may have independent buffering and flow control. In one such embodiment, three virtual networks may be present, including a first virtual network (e.g., VN0) and a second virtual network (e.g., VN1). These virtual networks may provide for flexible routing and deadlock avoidance. Furthermore, in such an embodiment, a third virtual network (e.g., VNA) may provide an adaptive buffer pool for efficient implementation.

In certain embodiments, the shared VNA may support a large number of message classes and may be used in connection with either VN0 or VN1 to avoid a deadlock situation. For example, a blocked message (e.g., an unavailable credit) may be transitioned to VN0 or VN1 and then back to VNA at a subsequent link. In one embodiment, VN1 and VN0 may perform flow control on a per message basis, while VNA may perform flow control on a per flit basis.

In various embodiments, each virtual network may include at least three virtual channels, as discussed above. However, it is to be understood that in other embodiments, more or fewer virtual networks may be present, and each such virtual network may include more or fewer virtual channels. For example, in various embodiments, in addition to the three virtual channels discussed above, a virtual network may include additional virtual channels for coherent transactions and isochronous transactions.

In various embodiments, physical layer 135 may be used to provide electrical transfer of information between two directly connected coherent agents via CSI wires 170 and through CSI fabric 180.

Figure 3:
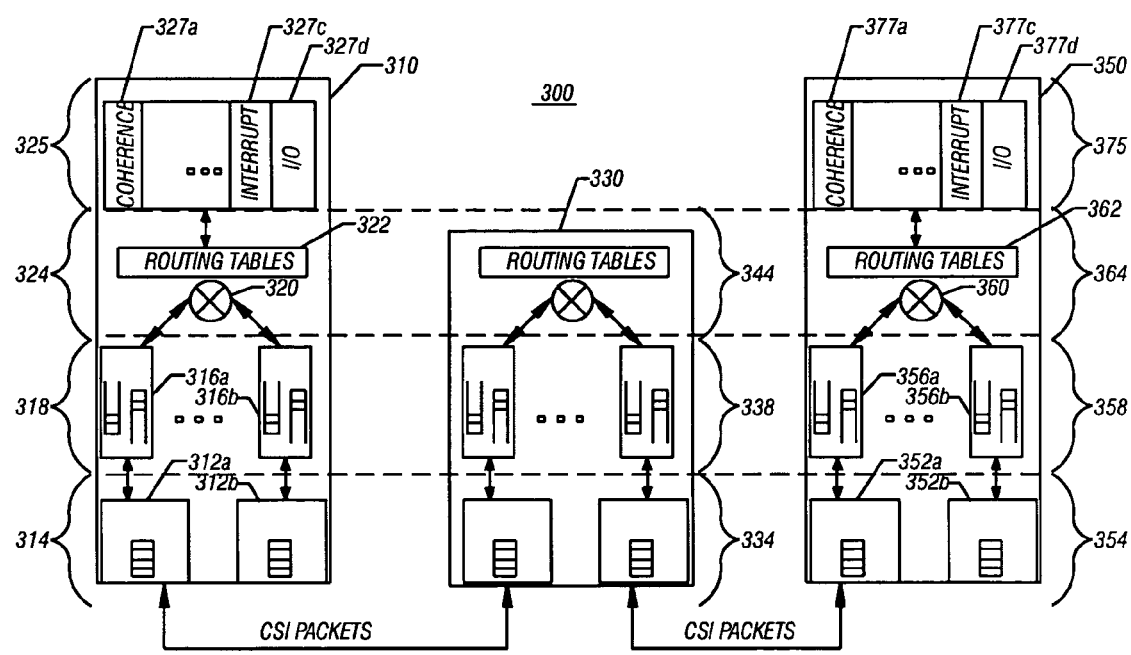
FIG. 3 is a block diagram of a portion of a coherent system in accordance with one embodiment of the present invention.

Referring now to FIG. 3, shown is a block diagram of a portion of a coherent system in accordance with one embodiment of the present invention. As shown in FIG. 3, system 300 includes a first CSI agent 310, a second CSI agent 350, and a bridging agent 330. In one embodiment, CSI agents 310 and 350 may be I/O hubs, while bridging agent 330 may be a switching device. In other embodiments, it is to be understood that agents may be microprocessors, other bus agents, and the like. While discussed in the embodiment of FIG. 3 as a coherent system, it is to be understood that the scope of the present invention is not so limited.

CSI agent 310 may include a plurality of layers, including a physical layer 314, a link layer 318, a routing layer 324 and a protocol layer 325. These layers may correspond to, respectively, physical layer 135, link layer 130, routing layer 125 and transaction layer 120 of FIG. 2. Packets may be received in CSI agent 310 at physical layer 314, which may include a plurality of electrical transfer ports 312a and 312b. While shown as including two such ports in the embodiment of FIG. 3, it is to be understood that additional ports may be present in other embodiments.

As shown in FIG. 3, the packets may be CSI packets, however the scope of the present invention is not so limited. Such packets may include a header and associated information (e.g., a "payload"). The packets are then forwarded to link layer 318, which may include a plurality of buffer flow control mechanisms. Shown in the embodiment of FIG. 3 are two buffer flow control mechanisms 316a and 316b, each of which may include an incoming buffer and an outgoing buffer.

When flits are properly received, link layer 318 may provide the flits to routing layer 324, where they are multiplexed through a switch 320 and provided to routing tables 322, which use, for example, a destination node ID field value to route the associated header and payload (if present) to the proper agent. If a packet is destined for agent 310, routing tables 322 will provide the packet to protocol layer 325. Alternately, if the packet is destined for another destination, the header and packet will be sent back through link layer 318 and physical layer 314 of agent 310 to a different agent.

In various embodiments of the present invention, protocol layer 325 may use a transaction ID associated with the header to order a transaction and perform desired processing thereon, using various engines within protocol layer 325. Shown as representative engines in the embodiment of FIG. 3, include a coherence engine 327a, an interrupt engine 327c, and an I/O engine 327d.

Similar functionality may be present in CSI agent 350, which includes a corresponding physical layer 354, link layer 358, routing layer 364, and protocol layer 375. As further shown in FIG. 3, each of these layers may include components similar to those of agent 310, including, for example, electrical transfer units 352a and 352b, buffer flow control mechanisms 356a and 356b, mixer 360, routing tables 362, and protocol engines 377a–377d.

Further shown in FIG. 3, a bridging agent 330 may include corresponding physical, link, and routing layers (respectively, physical layer 334, link layer 338, and routing layer 344). In certain embodiments, bridging agent 330 may be a switch, bridge, hub, or the like, and may be used to provide a bridge between a different set of agents or nodes of coherent system 300. For example, in another embodiment, bridging agent 330 may be coupled to a first plurality of processors (e.g., on a left hand side) and a second plurality of processors (e.g., on a right hand side).

By using a plurality of different channels to route different transaction types throughout a system, data communications within the system may be completely unordered. However, ordered transactions flowing through the system from a first peer device to a second peer device may be routed through the system in an unordered manner avoiding deadlocks, and be provided the second peer device with its ordering information remaining intact.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Example embodiments may be implemented in software for execution by a suitable computer system configured with a suitable combination of hardware devices. For example, in certain embodiments, various agents of a coherent system, such as I/O hubs, may include code or logic to separate transactions into different virtual channels as described above.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving incoming transactions to an agent of a coherent system in a first input queue;
forwarding at least some of the transactions from the first input queue to a second input queue; and
separating the incoming transactions to the agent into a first virtual network including at least a first channel, a second channel, and a third channel and a second virtual network including a fourth channel and a fifth channel, based upon a type of the incoming transactions.

2. The method of claim 1, further comprising routing a first transaction type through the coherent system on the first channel and routing a second transaction type through the coherent system on the second channel.

3. The method of claim 1, wherein the first channel comprises a standard channel, the second channel comprises a bypass channel, and the third channel comprises a completion channel.

4. The method of claim 1, further comprising maintaining a first transaction type separate from a second transaction type through the coherent system.

5. The method of claim 1, further comprising using a multiplexer of the agent of the coherent system coupled to the first input queue and the second input queue to separate the incoming transactions.

6. The method of claim 4, further comprising separating credits between the first transaction type and the second transaction type.

7. The method of claim 4, further comprising independently controlling flow of the first transaction type and the second transaction type.

8. The method of claim 4, wherein the first transaction type comprises a write transaction, and the second transaction type comprises a read transaction.

9. The method of claim 4, further comprising sending a completion packet from a completer agent to a requester agent after receipt of the first transaction type.

10. The method of claim 9, further comprising sending the completion packet on a different channel from the first transaction type and the second transaction type.

11. An article comprising a machine-accessible storage medium containing instructions that if executed enable a system to:
receive incoming transactions to an agent of the system in a first input queue;
forward at least some of the transactions from the first input queue to a second input queue; and
separate the incoming transactions to the agent into a first virtual network including at least a first channel, a second channel, and a third channel and a second virtual network including a fourth channel and a fifth channel, based upon a type of the incoming transactions.

12. The article of claim 11, further comprising instructions that if executed enable the system to separate credits between a first transaction type and a second transaction type.

13. The article of claim 12, further comprising instructions that if executed enable the system to independently control flow of the first transaction type and the second transaction type.

14. An apparatus comprising:
a first bus agent to receive incoming transactions, the first bus agent including:
a first input queue to receive the incoming transactions;
a second input queue to receive at least some of the incoming transactions from the first input queue; and
a multiplexer coupled to an output of the first and second input queues to provide a selected output to a transaction layer, wherein the transaction layer is to route the incoming transactions via a first virtual network including at least three channels or a second virtual network including at least three other channels, based upon a type of the incoming transactions.

15. The apparatus of claim 14, wherein a first channel comprises a standard channel, a second channel comprises a bypass channel, and a third channel comprises a completion channel.

16. The apparatus of claim 14, further comprising a second bus agent coupled to the first bus agent, the second bus agent having the at least three channels.

17. The apparatus of claim 14, wherein the first bus agent is adapted to receive the incoming transactions from a peer device having a non-coherent protocol.

18. A system comprising:
a first bus agent to receive incoming transactions in a first input queue and forward at least some of the incoming transactions from the first input queue to a second input queue, wherein the first bus agent is to further route outputs of the first input queue and the second input queue via a first virtual network including at least three channels or a second virtual network including at least three other channels, based upon a type of the incoming transactions; and
a second bus agent coupled to the first bus agent via a point-to-point interconnect.

19. The system of claim 18, wherein the first bus agent is adapted to receive the incoming transactions from a peer device having a non-coherent protocol.

20. The system of claim 18, wherein the first bus agent and the second bus agent comprise coherent devices.

21. The system of claim 18, wherein a first channel comprises a standard channel, a second channel comprises a bypass channel, and a third channel comprises a completion channel.

22. The method of claim 1, further comprising;
routing a transaction from the agent via the first virtual network to a second agent; and
routing the transaction from the second agent via the second virtual network.

23. The method of claim 1, further comprising forwarding the at least some transactions based on a level of the first input queue.

24. The method of claim 1, further comprising forwarding posted transactions from the first input queue to the second input queue.

25. The apparatus of claim 14, wherein the transaction layer is to receive an incoming transaction via the first virtual network and to transmit the incoming transaction via the second virtual network.

26. The method of claim 4, wherein maintaining the first transaction type and the second transaction type separate comprises routing the first transaction type through the coherent system on a first channel and routing the second transaction type through the coherent system on a second channel.

* * * * *